United States Patent [19]

Monte

[11] Patent Number: 5,156,875

[45] Date of Patent: Oct. 20, 1992

[54] STABILIZED ANTIMICROBIAL FOOD COMPOSITION

[75] Inventor: Woodrow C. Monte, Tempe, Ariz.

[73] Assignee: Doyle W. Boatwright, Phoenix, Ariz.; a part interest

[21] Appl. No.: 716,386

[22] Filed: Jun. 17, 1991

[51] Int. Cl.$^5$ .............................................. A23L 1/29
[52] U.S. Cl. .................................. 426/532; 426/335; 426/656; 426/657; 426/658; 426/654
[58] Field of Search ............... 426/532, 335, 656, 657, 426/658, 654

[56] References Cited

U.S. PATENT DOCUMENTS 4,112,123  9/1978  Roberts ................................. 426/72
4,931,300  6/1990  Monte .................................. 426/532

OTHER PUBLICATIONS

Hawley, The Condensed Chemical Dictionary, 10th Ed., 1981, Van Nostrand Reinhold Co.: New York, pp. 210, 673.

*Primary Examiner*—Joseph Golian
*Attorney, Agent, or Firm*—Tod R. Nissle

[57] ABSTRACT

A nutritionally balanced water soluble powdered food composition which, when mixed with water, has a low pH, extended shelf life, high antimicrobial activity, and which includes protein alpha-amino acids in solution or in suspension. The food composition utilizes a binary stabilizer system.

2 Claims, No Drawings

STABILIZED ANTIMICROBIAL FOOD COMPOSITION

This invention relates to nutritionally balanced food compositions for ingestion along the digestive tract of a patient.

More particularly, the invention relates to nutritionally balanced water soluble powdered food compositions which, when mixed with water, have a low pH, extended shelf life, high antimicrobial activity, and which include protein alpha-amino acids in solution or in suspension.

In a further respect, the invention relates to a water soluble powdered food composition including a binary-stabilizer system which, when the food composition is mixed with water, maintains its homogeneity and exhibits unusually low aerobic and anerobic bacterial activity for long periods of time at room temperature.

Water soluble powdered nutritionally balanced food compositions are known in the art. See, for example, my U.S. Pat. No. 4,931,300 for "ANTIMICROBIAL FOOD COMPOSITION".

Water soluble nutritionally balanced powdered food compositions like those described in my U.S. Pat. No. 4,931,300 have several potential disadvantages. Protein tends to precipitate from solutions which, like the food composition in U.S. Pat. No. 4,931,300, have acidic pH values in the range of 2.0 to 5.5. Solutions with low pH values in the range of 2.0 to 5.5 are, however often preferred because the acidity of the solutions normally provides a high level of antimicrobial activity. Food compositions like the compositions disclosed in U.S. Pat. No. 4,931,300 are an exception and do not provide a high degree of antimicrobial activity. This is evidenced by the fact that the food composition in my U.S. Pat. No. 4,431,300 must be refrigerated after it is reconstituted and must then be utilized within about seventy-two hours. Even though the seventy-two hour shelf life of the reconstituted food composition is relatively short, it is still substantially longer than the shelf life of other comparible food compositions. See, for example, U.S. Pat. No. 4,112,123 to Roberts, where the shelf life of a comparable reconstituted refrigerated food composition is only about twenty-four hours. Another problem associated with acidic aqueous food compositions of the type described in U.S. Pat. Nos. 4,112,123 and 4,931,300 is that identifying an appropriate stabilizer for the food composition is difficult. The stabilizer must be able to act quickly when the food composition is reconstituted as a drink, must not produce a composition which has excessive viscosity, must have an extended shelf life, and must be able to resist degradation due to the acidic nature of the food composition.

Accordingly, it would be highly desirable to provide a water soluble food composition which would, when mixed with a liquid to form a drink, produce a low viscosity solution which has a pH in the range of about 2.0 to 6.5, has a high antimicrobial activity, has an extended shelf life at room temperature, and which prevents particles from precipitating or settling from solution.

Therefore, it is a principal object of the invention to provide an improved food composition.

Another object of the invention is to provide a nutritionally balanced water soluble food composition which includes protein alpha-amino acids and which, when reconstituted in aqueous solution at a pH of about 2.0 to 6.0, generally prevents food composition particulate from precipitating or separating from the aqueous solution.

A further object of the invention is to provide a nutritionally balanced water soluble food composition which includes a binary stabilizer system which, when reconstituted in an aqueous solution, has a high antimicrobial activity and has an extended shelf life at room temperature.

These and other, further and more specific objects and advantages of the invention will be apparent to those skilled in the art from the following detailed description thereof.

Briefly, I have discovered a food composition which has a high antimicrobial activity and extended shelf life The food composition includes from 6% to 28% by weight of water soluble protein alpha-amino acids; from 4 to 22% by weight of triglycerides of predominantly 6 to 26 carbon atoms in the fatty acid chain; from 45% to 78% by weight of carbohydrates selected from the group consisting of corn syrup solids, trisaccharides, tetrasaccharides, pentasaccharides, hexasaccharides, dextrose, fructose, sucrose, maltose, oligosaccharides and high saccharides; from 0.1% to 10.0% by weight of an emulsifier; from 0.1% to 8% by weight of an edible acid; from 0.01% to 6% by weight of an antimicrobial agent selected from the group consisting of sorbic acid, benzoic acid, sodium benzoate, potassium sorbate, sodium sorbate, and potassium benzoate; from 1% to 8.5% by weight of modified starch; and, from 0.2% to 5% by weight of cellulose gum. The food composition provides up to about three calories per cubic centimeter of composition. On being reconstituted with a liquid, the composition forms a liquid solution which has an osmolarity of 250 to 650 and in which at least twenty-one percent by weight of the acid formed in the liquid solution by the antimicrobial agent is undissociated acid. The pH of the reconstituted food composition is from 2 to 6.5.

For purposes of the present specification, the term protein alpha-amino acids is defined to include monopeptides, dipeptides, tripeptides, and oligopeptides prepared by the partial hydrolysis of proteins or by synthesis and to include whey protein.

Peptide alpha-amino acids are preferred in the practice of the invention because they help in reducing the pH of the food composition and, consequently, in reducing the quantity of acidulant required in preparing the food composition. A peptide is any of a class of amides that are derived from two or more amino acids by combination of the amino group of one acid with carboxyl group of another, that yield these acids on hydrolysis, that are classified according to the number of component amino acids, and that are obtained by partial hydrolysis of proteins or by synthesis (as from alpha-amino acids or their derivatives). A dipeptide is a peptide that yields two molecules of amino acid on hydrolysis. A polypeptide is a polyamide that yields amino acids on hydrolysis but has a lower molecular weight than a protein and that is obtained by partial hydrolysis of proteins or by synthesis. Peptides are easier to digest than whey and other proteins.

Peptides are prepared from hydrolyzing proteins of any kind, and are commonly prepared by hydrolyzing egg, milk, or soy.

For purposes of the present specification, the term "whey protein" is defined to mean that water soluble or suspendible, essentially undenatured protein fraction derived from cheese whey which protein fraction is, essentially, retained by an ultra-filtration membrane that permits lactose, lactic acid, and soluble salts to pass through the membrane. Whey protein is specific and identifiable in terms of its composition and is not necessarily dependent upon a process for production thereof. Whey protein may be obtained by methods other than ultra-filtration, e.g., gel filtration.

The amount of protein alpha-amino acids used in the present powder composition may vary widely, but for most applications from 4% to 22% on a dry weight basis is suitable, especially between about 15% and 20%.

The protein alpha-amino acids are essentially water soluble or suspendible, and capable of being compounded or formulated into stable and pourable form in order to function in the manner required. Further, it is the protein alpha-amino acid fraction containing one or more than twenty alpha-amino acids, most of which have the general formula $RCH(NH_2)COOH$, that are synthesized in plant and animal tissues, that are considered the building blocks of proteins, from which they can be obtained by hydrolysis, and that play an important role in metabolism, growth, maintenance and repair of tissue.

Table 1 in U.S. Pat. No. 4,112,123 to Roberts shows a typical amino acid profile for whey protein used in the present invention.

Medium-chain triglycerides (MCT's) utilized in the food composition of the invention produce a composition of low viscosity while concomitently providing high caloric content and easily digestible compositions. The fatty acid chains of the medium-chain triglycerides are predominantly between about 6 and 12 carbon atoms, and are preferably utilized in conjunction with long-chain triglycerides (LCT's) in which fatty acid chains are predominately between about 14 to 26 carbon atoms.

The proportion of LCT's and MCT's in the powder food composition can vary widely, but typically is about 4% to 22% by weight, with 12%–18% being an optimal range.

Any food grade emulsifier is used for present emulsification purposes and combinations of emulsifiers are used if desired. Any of the long fatty acid glycerol emulsifiers can be used, which normally have a C-12 to C-20 esterified chain. Typical among these are glycerollactopalmitate or the sterate. Alternately, propolyene derived emulsifiers may be used, such as prophylene glycomonosterate, or the oleate, palmitate, and myristate. Likewise, the "Span" series of emulsifiers may be used. These are well-known emulsifiers and are fatty acid partial esters of the sorbitol anhydrides (or sorbitan). One well known emulsifier is the "Tween" series of polyoxyethylene derivatives of fatty acid partial esters of sorbitol anyhydride. Tween 80 and Atmos 300 are often used in combination. The well known Atmos series of mono and diglycerides may be used. Also, lecithin is a suitable emulsifier. The amount of the emulsifier is chosen to suit the particular powder food composition, and generally ranges from about 0.1% to 10% by weight.

The powder food composition contains from 45% to 78% by weight of carbohydrates. The carbohydrates may be any of the digestible carbohydrates such as dextrose, fructose, sucrose, maltose, oligosaccharides, higher saccharides, or mixtures thereof, depending on usage.

Vitamins, minerals, and other trace elements can be used to supplement the food composition and for purposes of total nutritional balance. These supplements can be varied as desired but are typically equal to the RDA or greater based on 2,000 calories. Soy bran, rice bran, or other fiber polysaccharides or sources of fiber can be included in the food composition.

Conventional coloring agents, such as the FDA colors, may be used, as well as conventional preservatives, such as BHT and BHA. BHT and BHA preserve fats.

The food composition is provided in a powdered form having a relatively low moisture content. The moisture content is, as is the case for many powdered formulations, preferably at least below 4% by weight and more preferably below 3% by weight. Such low moisture content provides a product having a shelf life of at least one year shelf stability at ambient conditions if hermetically sealed.

The powdered form of the food composition may be reconstituted with a liquid. The liquid form of the food composition of the invention need not be pasteurized or stored under refrigerated conditions.

The dried powder is reconstituted with any desired edible liquid. The powder is ordinarily partially dissolved and partially suspended in the resulting liquid form of the invention. While it is possible to reconstitute the composition with liquid such as alcohol, the reconstituting liquid will ordinarily be principally water. The water may contain additional ingredients such as alcohol, glycerol, proplyene glycol, sugars and flavor.

The caloric content of the liquid solutions of the reconstituted food composition of the invention is adjusted to any desired level up to about 3 calories per cubic centimeter. One half to two calories per cubic centimeter is preferred.

The osmolarity of the reconstituted food composition is in the range of 250 to 650, but preferably is in the range of 275 to 350 mOSm per liter of 1 calorie per cubic centimeter of food.

The powder food compositions also include 0.1% to 8% by weight edible acidulants such as malic acid, acetic acid, citric acid, lactic acid, sodium acetate, fumaric acid, or an acidic salt such as sodium acetate in order to adjust the pH within the range of 2 to 6.5. This pH is critical to the extended shelf life of the invention. Any pH in excess of about 6.5 is not preferred because such allows greater microbial activity and minimizes the antimicrobial effects of sorbates and benzoates utilized in the invention. A pH greater than 6.5 is totally unacceptable because of the greatly reduced antimicrobial activity of the sorbates and benzoates critical to the invention.

The antimicrobial activity of sorbic and benzoic acid is due primarily to the undissociated acid molecule. Antimicrobial activity is therefore pH dependent and the estimated activity at any pH can be estimated as shown below in Table 1.

TABLE 1

| EFFECT OF pH ON DISSOCIATION | | |
|---|---|---|
| | Percent Undissociated Acid | |
| pH | Sorbic | Benzoic |
| 3 | 98 | 94 |
| 4 | 86 | 60 |
| 5 | 37 | 13 |
| 6 | 6 | 1.5 |
| 7 | 0.6 | 0.15 |

The food composition includes 0.01% to 6% by weight of a sorbate or benzoate such as sorbic acid, benzoic acid, potassium sorbate, sodium sorbate, potassium benzoate, sodium benzoate, and the like. Such benzoates and sorbates are crucial because at low pH values in the range of 2 to 6.5 they provide significant antimicrobial activity.

A novel binary stabilizer system is utilized in the powder food composition of the invention. Various conventional stabilizers will not function properly in the food composition and permit particulate to settle out of the reconstituted mixture in less than six hours, often in less than one hour. I have discovered a novel binary stabilizer system which effectively stabilizes the reconstituted food composition of the invention for long periods at room temperature. The binary-stabilizer food composition of the invention also appears to produce an interactive synergistic effect which causes the bacteria count in the reconstituted food composition to be unusually low when the food composition is permitted to set exposed to the air at room temperature for days at a time.

The binary stabilizer system includes from 1% to 8.5% by dry weight modified starch, such as modified potato starch, and includes from 0.2% to 5% by weight of cellulose gum. Utilizing modified starch in the food composition without cellulose gum is not acceptable because the acidic conditions in the food composition break down the starch and because too viscous a solution is produced. When, however, modified starch is utilized in combination with cellulose gum a food composition results which is unusually stable and resistant to the growth of aerobic and anerobic bacteria. Samples of the reconstituted food composition of the invention have been left exposed to the air for ten days with the detection of no anerobic bacteria and with the detection of fewer than 10 to 20 aerobic bacteria per milliliter of reconstituted food composition. The growth of so few bacteria is highly unusual, if not unique.

As used herein, the term "modified starch" refers to starch which has been subjected to depolymerization treatment by acid, heat, or other means to attack the amorphous regions of the starch granules while leaving the crystalline areas of the granules relatively intact. In other words, the starch is not reduced sufficiently to form dextrins. Instead, the modified starch retains a tertiary structure while, in comparison to untreated or unmodified starches, experiencing decreased viscosity of the hot paste, decreased intrinsic viscosity, decreased gel strength, and increased gelatinization temperature. Corn, sorghum, wheat, potato, and other plant starches can be utilized in producing the modified starch utilized in the practice of the invention. Potato starch is, however, presently preferred.

After the dried powder food composition of the invention is reconstituted it has an extended shelf life at room temperature of about ten days or more. The ratio of water to composition will vary with the proportion of the ingredients of the composition and with the desired consistency required, as discussed above. By way of example, on a weight/weight basis of composition to water, the dilutions on a 100 gram basis can be:

| Calories/ml. of solution | To make 100 grams solution gms powd*/gms water | Approximate Visosity (centipoises) |
|---|---|---|
| 0.5 | 18/82 | <100 |
| 1 | 25/75 | 100 |
| 1.5 | 32/68 | 250 |
| 2 | 40/60 | 500 |

*Powder of Example 1 below.

The following examples depict the presently preferred embodiments of the invention for the purpose of illustrating the practice thereof and not by way of limitation of the scope of the invention. In the examples, all proportions are by weight, unless otherwise noted.

EXAMPLE 1

The food composition in powder form was prepared by blending a number of ingredients.

| | |
|---|---|
| MALTODEXTRIN (POLYSACCHARIDE) | 27.85536 |
| MALTODEXTRIN AGGLOMERATED | 24.53924 |
| MCT OIL | 6.76487 |
| CORN OIL | 6.76487 |
| WHEY PROTEIN POWDER | 9.28512 |
| HYDROLYZED PROTEIN POWDER (dipeptides, tripeptides, oligopeptides) | 8.84297 |
| SODIUM ACETATE | 0.8843 |
| POTASSIUM CITRATE | 0.57479 |
| CALCIUM PHOSPHATE TRIBASIC | 0.70744 |
| DIPOTASSIUM PHOSPHATE | 0.79587 |
| MAGNESIUM CHLORIDE 6H | 0.8843 |
| CITRIC ACID | 1.94545 |
| FERROUS SULFATE | 0.01365 |
| ZINC SULFATE 1H | 0.01852 |
| MANGANESE SULFATE 1H | 0.00458 |
| CUPRIC SULFATE 5H | 0.00224 |
| CHROMIC CHLORIDE | 0.00012 |
| POTASSIUM IODIDE | 0.00005 |
| SELINIUM OXIDE | 0.00003 |
| MOLYBDENUM TRIOXIDE | 0.00003 |
| LECITHIN | 0.44215 |
| SODIUM ASCORBATE | 0.44215 |
| CHLORINE CHLORIDE | 0.2047 |
| VITAMIN E (500 IU/GM) | 0.04971 |
| NIACINAMIDE | 0.01803 |
| CALCIUM PANTHOTHENATE | 0.0156 |
| THIAMINE HYDROCHLORIDE | 0.00244 |
| PYRIDOXINE HYDROCHLORIDE | 0.00302 |
| RIBOFLAVIN | 0.00175 |
| VITAMIN A (250,000 IU/GM) | 0.01072 |
| FOLIC ACID | 0.00044 |
| BIOTIN (1% 10 MG/GM) | 0.02534 |
| VITAMIN K 1% | 0.00429 |
| VITAMIN D 3 (1,000,000 IU/GM) | 0.00292 |
| CYANOCOBALAMIN (0.1%) | 0.00575 |
| SODIUM SORBATE | 1.59173 |
| SOY POLYSACCHARIDE (FIBER) | 7.29545 |
| TOTAL WEIGHT | 100.00000 |

The approximate percent calories from the various ingredients are carbohydrates 52.4%, fat 30.5%, and protein 17.1%. The carbohydrates included in the powder food composition include sucrose, dextrose, maltose, lactose, trisaccharides, tetrasaccharides, pentasaccharides, hexasaccharides, and higher saccharides. When 25 gm of the food powder composition is reconstituted with 75 gm of water the resulting mixture has a caloric density (Cal/ml) of 1.07; of total Cal/Nitrogen ratio of 145.9; a non-protein Cal/Nitrogen ratio of 120.9; a protein concentration of 45.8 g/liter; a fat concentration of 36.1 g/liter; a carbohydrate (digestible) concentration of 140 g/liter; a carbohydrate (total) concentration of 153.8 g/liter; and a dietary fiber concentration of 14 g/liter.

During the blending of the above-listed ingredients of the food composition, agglomeration techniques are preferably employed to make the resulting powder mixture more easily dispersed and soluble in water.

EXAMPLE 2

Twenty-five grams of the food composition powder of Example 1 is mixed with 75 grams of water. The resulting drink provides 1.1 calories per cubic centimeter, has a pH of 4.7, has an osmolarity of 300, has a viscosity of about 90 to 100 centipoise, and has particles each having a size of less than about 100 mesh.

EXAMPLE 3

One thousand grams of a food composition in powder form was prepared by blending the following ingredients in the proportions noted.

| INGREDIENT | WEIGHT PERCENT Dry |
|---|---|
| Sugar | 5.5 |
| Whey Protein Concentrate FORETEIN 35 (protein alpha-amino acids) | 13.97 |
| Calcium Lactate, Pentahydrate | 3.67 |
| CREATIVE CREAMER 829 (fat emulsifier) | 5.5 |
| Maltodextrin, M100 (agglomerated) | 60.53 |
| Citric Acid | 2.2 |
| AVGBE PREGEL VA-70 (modified potato starch) | 5.5 |
| HERCULES CELLULOSE GUM, CMC-7HF | 1.83 |
| Emulsifier, BEATREME 3581Z (fat emulsifier) | .22 |
| Sodium Citrate | .21 |
| VITAMIN PREMIX 110584 (mixture of vitamins A, D, C, K etc.) | .22 |
| Magnesium Oxide | .18 |
| Potassium Sorbate | .46 |
| Water | |
| | 100.00 |

The approximate percent Calories from the various ingredients are carbohydrates 50%, fat 30%, and protein 18%. The carbohydrates included in the powder food composition include sucrose, dextrose, maltose, lactose, trisaccharides, tetratsaccharides, pentasaccharides, hexasaccharides, and higher saccharides. When 25 gm of the food powder composition is reconstituted with 75 gm of water, the resulting mixture has a caloric density (Cal/ml) of about 1; a total Cal/Nitrogen ratio of about 140; a non-protein Cal/Nitrogen ratio of about 120; a protein concentration of about 45 grams/liter; a fat concentration of 36 g/liter; a carbohydrate (digestible) concentration of about 140 g/liter; a carbohydrate (total) concentration of about 150 g/liter; and, a dietary fiber concentration of 14 g/liter.

EXAMPLE 4

Two hundred and thirty seven grams of the food composition powder of EXAMPLE 3 was mixed with 832 milliliters of sterile distilled water at 5:00 pm on Mar. 11, 1991. The resulting drink provided about 1 calorie per cubic centimeter, had a pH of about 4.6, had an osmolarity of about 300, had a viscosity of about 90 to 100 centipoise, and had particulate each having a size of less than about 100 mesh.

EXAMPLE 5

One thousand grams of the powder of EXAMPLE 3 was prepared by mixing the ingredients in the proportions noted, except 0.23 grams of potassium sorbate was substituted for the 0.46 grams of potassium sorbate.

EXAMPLE 6

Two hundred and thirty seven grams of the food composition powder of Example 5 was mixed with 832 milliliters of sterile distilled water at 5:00 pm on Mar. 11, 1991. The resulting drink provided about 1 calorie per cubic centimeter, had a pH of about 4.6, had an osmolarity of about 300, had a viscosity of about 90 to 100 centipoises, and had particles of food composition each having a size of less than about 100 mesh.

EXAMPLE 7

As soon as the drink (suspension) of EXAMPLE 4 was produced, i.e., as soon as the rehydration of the powder was performed, a plate count was performed to determine the presense of aerobic and anerobic bacteria. The plate count was performed by transferring one milliliter of the drink to a 10 milliliter enriched Thio. The Thio was incubated at 35° C. for four days to culture for anaerobes. The Thio was then examined to determine the existence of aerobic and anaerobic bacteria. The foregoing plate count procedure was carried out in accordance with the FDA Bacteriological Analytical Manual, 4th Edition, 1984, Chapter 4, and with the ASM Manual of Clinical Microbiology, 4th Edition, 1985.

The drink of EXAMPLE 4 was stored at room temperature exposed to the air. A plate count was initiated at 5:00 pm each day for ten consecutive days. As shown below in TABLE II, in each plate count less than ten aerobic organisms per gram were detected. No anerobic bacteria were detected during any of the plate counts.

TABLE II

| PLATE COUNT RESULTS SHOWING ABSENCE OF AEROBIC BACTERIA IN SUSPENSION | | |
|---|---|---|
| PLATE COUNT FOR DAY NO. | DESCRIPTION | AEROBIC ORGANISMS PER MILLILITER |
| 1 | Rehydration, 3/11/91, 5:00 pm | <10 |
| 2 | 1 day, 3/12/91, 5:00 pm | <10 |
| 3 | 2 days, 3/13/91, 5:00 pm | <10 |
| 4 | 3 days, 3/14/91, 5:00 pm | <10 |
| 5 | 4 days, 3/15/91, 5:00 pm | <10 |
| 6 | 5 days, 3/16/91, 5:00 pm | <10 |
| 7 | 6 days, 3/17/91, 5:00 pm | <10 |
| 8 | 7 days, 3/18/91, 5:00 pm | <10 |
| 9 | 8 days, 3/19/91, 5:00 pm | <10 |
| 10 | 9 days, 3/20/91, 5:00 pm | <10 |
| 11 | 10 days, 3/21/91, 5:00 pm | <10 |

EXAMPLE 8

As soon as the drink (suspension) of EXAMPLE 6 was produced, i.e., as soon as the rehydration of the powder was performed, a plate count was performed to determine the presense of aerobic and anerobic bacteria. The plate count was performed by transferring one milliliter of the drink to a 10 milliliter enriched Thio. The Thio was incubated at 35° C. for four days to culture for anaerobes. The Thio was then examined to determine the existence of aerobic and anaerobic bacteria. The foregoing plate count procedure was carried out in accordance with the FDA Bacteriological Analytical Manual, 4th Edition, 1984, Chapter 4, and with the ASM Manual of Clinical Microbiology, 4th Edition, 1985.

The drink of EXAMPLE 6 was stored at room temperature. A plate count was initiated at 5:00 pm each day for ten consecutive days. As shown below in TABLE III, in each plate count twenty or less aerobic organisms per gram were detected. No anerobic bacteria were detected during any of the plate counts.

TABLE III

PLATE COUNT RESULTS SHOWING ABSENCE OF AEROBIC BACTERIA IN SUSPENSION

| PLATE COUNT FOR DAY NO. | DESCRIPTION | AEROBIC ORGANISMS PER MILLILITER |
|---|---|---|
| 1 | Rehydration, 3/11/91, 5:00 pm | <10 |
| 2 | 1 day, 3/12/91, 5:00 pm | 20 |
| 3 | 2 days, 3/13/91, 5:00 pm | <10 |
| 4 | 3 days, 3/14/91, 5:00 pm | <10 |
| 5 | 4 days, 3/15/91, 5:00 pm | <10 |
| 6 | 5 days, 3/16/91, 5:00 pm | <10 |
| 7 | 6 days, 3/17/91, 5:00 pm | <10 |
| 8 | 7 days, 3/18/91, 5:00 pm | <10 |
| 9 | 8 days, 3/19/91, 5:00 pm | <10 |
| 10 | 9 days, 3/20/91, 5:00 pm | <10 |
| 11 | 10 days, 3/21/91, 5:00 pm | <10 |

EXAMPLE 9

Two hundred and thirty seven grams of the food composition powder of EXAMPLE 3 was mixed with 832 milliliters of sterile distilled water in a beaker to form a homogeneous solution. The solution had a viscosity of about 250 centipoises. The size of food composition particles in suspension in the solution was less than 100 mesh. The solution was allowed to stand for ten days at room temperature. At the end of the ten day period, the solution was still substantially homogeneous and particulate had not settled or separated out of solution to form layers of material at the bottom of the beaker.

EXAMPLE 10

Two hundred and thirty seven grams of the food composition powder of EXAMPLE 5 was mixed with 832 milliliters of sterile distilled water in a beaker to form a homogeneous solution. The solution has a viscosity of about 250 centipoises. The size of food composition particles in suspension in the solution was less than or equal to 100 mesh. The solution was allowed to stand for ten days at room temperature. At the end of the ten day period, the solution was still substantially homogeneous and particulate had not settled or separated out of solution to form layers of material at the bottom of the beaker.

EXAMPLE 11

One thousand grams of the powder of EXAMPLE 3 was prepared by mixing the ingredients in the proportions noted, except that 73.3 grams of carrageenin was utilized in place of the AVGBE PREGEL VA-70 (55 grams) and of the HERCULES CELLULOSE GUM (18.3 grams).

EXAMPLE 12

Two hundred and thirty seven grams of the food composition powder of EXAMPLE 11 was mixed with 832 milliliters of sterile distilled water in a beaker to form a homogeneous solution. The solution had a viscosity of about 250 centipoises. The size of food composition particles in suspension in the solution was less than or equal to 100 mesh. The solution was allowed to stand at room temperature. In less than six hours particulate began settling and separating out of the solution to form a layer of material at the bottom of the beaker.

EXAMPLE 13

One thousand grams of the powder of EXAMPLE 3 was prepared by mixing the ingredients in the proportions noted, except that 73.3 grams of guar gum was utilized in place of the AVGBE PREGEL VA-70 (55 grams) and of the HERCULES CELLULOSE GUM (18.3 grams).

EXAMPLE 14

Two hundred and thirty seven grams of the food composition powder of EXAMPLE 13 was mixed with 832 milliliters of sterile distilled water in a beaker to form a homogeneous solution. The solution had a viscosity of about 250 centipoises. The size of food composition particles in suspension in the solution was less than or equal to 100 mesh. The solution was allowed to stand at room temperature. In less than six hours particulate began settling and separating out of the solution to form a layer of material at the bottom of the beaker.

EXAMPLE 15

One thousand grams of the powder of EXAMPLE 3 was prepared by mixing the ingredients in the proportions noted, except that 73.3 grams of locust bean gum was utilized in place of the AVGBE PREGEL VA-70 (55 grams) and of the HERCULES CELLULOSE GUM (18.3 grams).

EXAMPLE 16

Two hundred and thirty seven grams of the food composition powder of EXAMPLE 15 was mixed with 832 milliliters of sterile distilled water in a beaker to form a homogeneous solution. The solution had a viscosity of about 250 centipoises. The size of food composition particles in suspension in the solution was less than or equal to 100 mesh. The solution was allowed to stand at room temperature. In less than six hours particulate began settling and separating out of the solution to form a layer of material at the bottom of the beaker.

EXAMPLE 17

One thousand grams of the powder of EXAMPLE 3 was prepared by mixing the ingredients in the proportions noted, except that 73.3 grams of soy polysaccharides was utilized in place of the AVGBE PREGEL VA-70 (55 grams) and of the HERCULES CELLULOSE GUM (18.3 grams).

EXAMPLE 18

Two hundred and thirty seven grams of the food composition powder of EXAMPLE 17 was mixed with 832 milliliters of sterile distilled water in a beaker to form a homogeneous solution. The solution had a viscosity of about 250 centipoises. The size of particles in suspension in the solution was less than or equal to 100 mesh. The solution was allowed to stand at room temperature. In less than six hours particulate began settling and separating out of the solution to form a layer of material at the bottom of the beaker.

EXAMPLE 19

One thousand grams of the powder of EXAMPLE 3 was prepared by mixing the ingredients in the proportions noted, except that 73.3 grams of pectin was utilized in place of the AVGBE PREGEL VA-70 (55 grams) and of the HERCULES CELLULOSE GUM (18.3 grams).

EXAMPLE 20

Two hundred and thirty seven grams of the food composition powder of EXAMPLE 19 was mixed with 832 milliliters of sterile distilled water in a beaker to form a homogeneous solution. The solution had a viscosity of about 250 centipoises. The size of particles in suspension in the solution was less than or equal to 100 mesh. The solution was allowed to stand at room temperature. In less than six hours particulate began settling and separating out of the solution to form a layer of material at the bottom of the beaker.

EXAMPLE 21

One thousand grams of the powder of EXAMPLE 3 is prepared by mixing the ingredients in the proportions noted, except that only ten grams of AVGBE PREGEL VA-70 is utilized instead of 55 grams.

EXAMPLE 22

Two hundred and thirty seven grams of the food composition powder of EXAMPLE 21 is mixed with 832 milliliters of sterile distilled water in a beaker to form a homogeneous solution. The solution has a viscosity of about 250 centipoises. The size of food composition particles in suspension in the solution is less than or equal to 100 mesh. The solution is allowed to stand for ten days at room temperature. At the end of the ten day period, the solution is still substantially homogeneous and particulate has not settled or separated out of solution to form layers of material at the bottom of the beaker.

EXAMPLE 23

One thousand grams of the powder of EXAMPLE 3 is prepared by mixing the ingredients in the proportions noted, except that only two grams of HERCULES CELLULOSE GUM is utilized instead of 18.3 grams.

EXAMPLE 24

Two hundred and thirty seven grams of the food composition powder of EXAMPLE 23 is mixed with 832 milliliters of sterile distilled water in a beaker to form a homogeneous solution. The solution has a viscosity of about 250 centipoises. The size of particles in suspension in the solution is less than or equal to 100 mesh. The solution is allowed to stand for ten days at room temperature. At the end of the ten day period, the solution is still substantially homogeneous and particulate has not settled or separated out of solution to form layers of material at the bottom of the beaker.

The viscosity of the food composition of the invention is important and is, in part, responsible for the difficulty in finding a suitable stabilizer. The viscosity is such that the food composition, when reconstituted with water, can be readily drunk. The viscosity at 68° F. of the reconstituted food composition is less than 10,000 centipoises, preferably less than 1000 centipoises. The viscosity of olive oil at 60° F. is 1008 millipoises; of sperm oil at 60° F. is 420 millipoises; of water at 68° F. is 10.02 millipoises; of caster oil at 68° F. is 10,272 millipoises; of turpentine at 68° F. is 14.87 millipoises; the methyl alcohol at 68° F. is 5.93 millipoises; and, of glycerol at 20° C. is 10,690 millipoises. The viscosity of glycerol at 20.9° C. is 7,776 millipoises. Even at low viscosities of 500 centipoises or less, the food composition of the invention retains its homogeniety. In one embodiment of the invention, the preferred viscosity is less than 500 centipoises.

The size of the particles in the food composition of the invention after the food composition is reconstituted is also important. Particles in the reconstituted food composition generally are each equal to or less than 100 mesh in size. A 20 mesh particle moves through a screen opening of 0.0331 inch; a 50 mesh particle moves through a screen opening of 0.0117 inch; a 100 mesh particle moves through a screen opening of 0.0059 inch; a 200 mesh particle moves through a screen opening of 0.0029 inch; a 270 mesh particle moves through a screen opening of 0.0021 inch; and, a 325 mesh particle moves through a screen opening of 0.0017 inch. Since particulate in the reconstituted food composition must remain in suspension, the particulate size is small.

The food composition of the invention is ingested at any desired point along the digestive tract, but ordinarily is administered to a patient orally or is tubally fed directly into the patient's stomach. If appropriate, the reconstituted food composition can be tubally directly fed into the intestinal tract or the esophagus.

Having described my invention in such terms as to enable those skilled in the art to understand and practice it, and having identified the presently preferred embodiments thereof, I claim:

1. A food composition for ingestion along the digestive tract of a patient, said food composition consisting of:
   (a) from 6% to 28% by weight of water soluble protein alpha-amino acids;
   (b) from 4% to 22% by weight of triglycerides of predominantly 6 to 26 carbon atoms in the fatty acid chain;
   (c) from 45% to 78% by weight of carbohydrates selected from the group consisting of corn syrup solids, trisaccharides, tetrasaccharides, pentasaccharides, hexasaccharides, dextrose, fructose, sucrose, maltose, oliosaccharides and higher saccharides;
   (d) from 0.1% to 10% by weight of an emulsifier;
   (e) from 0.1% to 8% by weight of an edible acid for adjusting the pH of the food composition within the range of 2 to 6;
   (f) from 0.01% to 6% by weight of an antimicrobial agent selected from the group consisting of sorbic acid, benzoic acid, sodium benzoate, potassium sorbate, sodium sorbate, and potassium benzoate;
   (g) from 1% to 8.5% by weight of modified starch; and,
   (h) from 0.2% to 5% by weight of cellulose gum.

2. The food composition of claim 1 in liquid form and
   (a) including water;
   (b) providing from 0.4 up to about 3 calories per cubic centimeter of composition;
   (c) having an osmolarity from 250 up to about 650;
   (d) having a viscosity of less than 500 centipoise; and,
   (e) including particulate, substantially all of said particulate being less than about 100 mesh in size.

* * * * *